United States Patent [19]

Zhao et al.

[11] Patent Number: 5,529,381
[45] Date of Patent: *Jun. 25, 1996

[54] CABLE-ACTUATED LINEAR RETRACTOR FOR A CHILD SEAT

[75] Inventors: Weiping Zhao, Westland; John J. Pollard, Ferndale, both of Mich.

[73] Assignee: AlliedSignal Inc., Morristown, N.J.

[ * ] Notice: The term of this patent shall not extend beyond the expiration date of Pat. No. 5,364,169.

[21] Appl. No.: 85,591

[22] Filed: Jul. 1, 1993

Related U.S. Application Data

[63] Continuation-in-part of Ser. No. 981,874, Nov. 25, 1992, Pat. No. 5,364,169.

[51] Int. Cl.⁶ ................................................. B60R 22/34
[52] U.S. Cl. .......................... 297/479; 297/467; 297/484; 297/238; 297/256.15
[58] Field of Search ................................ 297/476, 479, 297/238, 256.15, 467, 484

[56] References Cited

U.S. PATENT DOCUMENTS

| | | |
|---|---|---|
| 2,963,080 | 12/1962 | Zang . |
| 3,065,027 | 11/1962 | Misslich et al. . |
| 3,107,121 | 10/1963 | Mougey . |
| 3,174,704 | 3/1965 | Replogle ............................ 297/476 X |
| 3,184,267 | 5/1965 | Rumble . |
| 3,222,107 | 12/1965 | Ferrara . |
| 3,294,447 | 12/1966 | Riley . |
| 3,321,244 | 5/1967 | Davies et al. . |
| 3,439,933 | 4/1969 | Jantzen . |
| 3,439,952 | 4/1969 | Jantzen . |
| 3,472,552 | 10/1969 | Hopka . |
| 3,528,702 | 9/1970 | Boedigheimer . |
| 3,542,425 | 11/1970 | Pringle . |
| 3,545,788 | 12/1970 | Brawner . |
| 3,551,002 | 12/1970 | Dozois . |
| 3,558,189 | 1/1971 | Preston . |
| 3,583,763 | 6/1971 | Settimi . |
| 3,606,456 | 9/1971 | Cazabon . |
| 3,630,543 | 12/1971 | Cripps . |
| 3,645,549 | 2/1972 | Jantzen . |
| 3,667,806 | 6/1972 | Sprecher ................................ 297/479 |
| 3,915,402 | 10/1975 | Takada ............................. 297/476 X |
| 4,159,848 | 7/1979 | Manz . |
| 4,305,618 | 12/1981 | Molnar .................................... 297/476 |
| 4,655,503 | 4/1987 | Kamijo et al. ......................... 297/238 |
| 4,720,148 | 1/1988 | Anthony et al. ....................... 297/474 |
| 4,826,246 | 5/1989 | Meeker ............................. 297/256.15 |
| 5,061,012 | 10/1991 | Parker et al. . |
| 5,224,756 | 7/1993 | Dukatz ................................... 297/238 |
| 5,364,169 | 11/1994 | Collins ................................... 297/479 |
| 5,380,066 | 1/1995 | Wiseman et al. ...................... 297/476 |
| 5,398,997 | 3/1995 | McFalls ................................. 297/476 |

FOREIGN PATENT DOCUMENTS

| | | |
|---|---|---|
| 1311978 | 3/1973 | United Kingdom . |
| 2023415 | 1/1980 | United Kingdom ................... 297/238 |
| 2175194 | 11/1986 | United Kingdom . |

*Primary Examiner*—Peter M. Cuomo
*Assistant Examiner*—David E. Allred
*Attorney, Agent, or Firm*—Harness, Dickey & Pierce

[57] ABSTRACT

A linear-type belt retractor is disclosed which can be incorporated into the safety belt restraint system of a vehicular seat, auxiliary child seat or integral child seat. The linear-type belt retractor includes a stationary lock plate and a latch assembly supported for reciprocal longitudinal movement relative to the lock plate. A belt member of the safety belt restraint is slidably secured to the latch assembly such that movement of the latch assembly in a first direction causes withdrawal of the belt member and movement in a second direction causes retraction thereof. The belt retractor is operable in a first mode for permitting movement of latch assembly on the lock plate in both directions, and in a second mode for inhibiting movement of the latch assembly in the first direction. A remote actuation mechanism is provided for automatically shifting the belt retractor into the second mode in response to fastening of a tongue plate of the safety belt restraint to a belt buckle member. The remote actuation mechanism is also operable to automatically shift the retractor into the first mode upon subsequent release of the tongue plate from the buckle member.

37 Claims, 9 Drawing Sheets

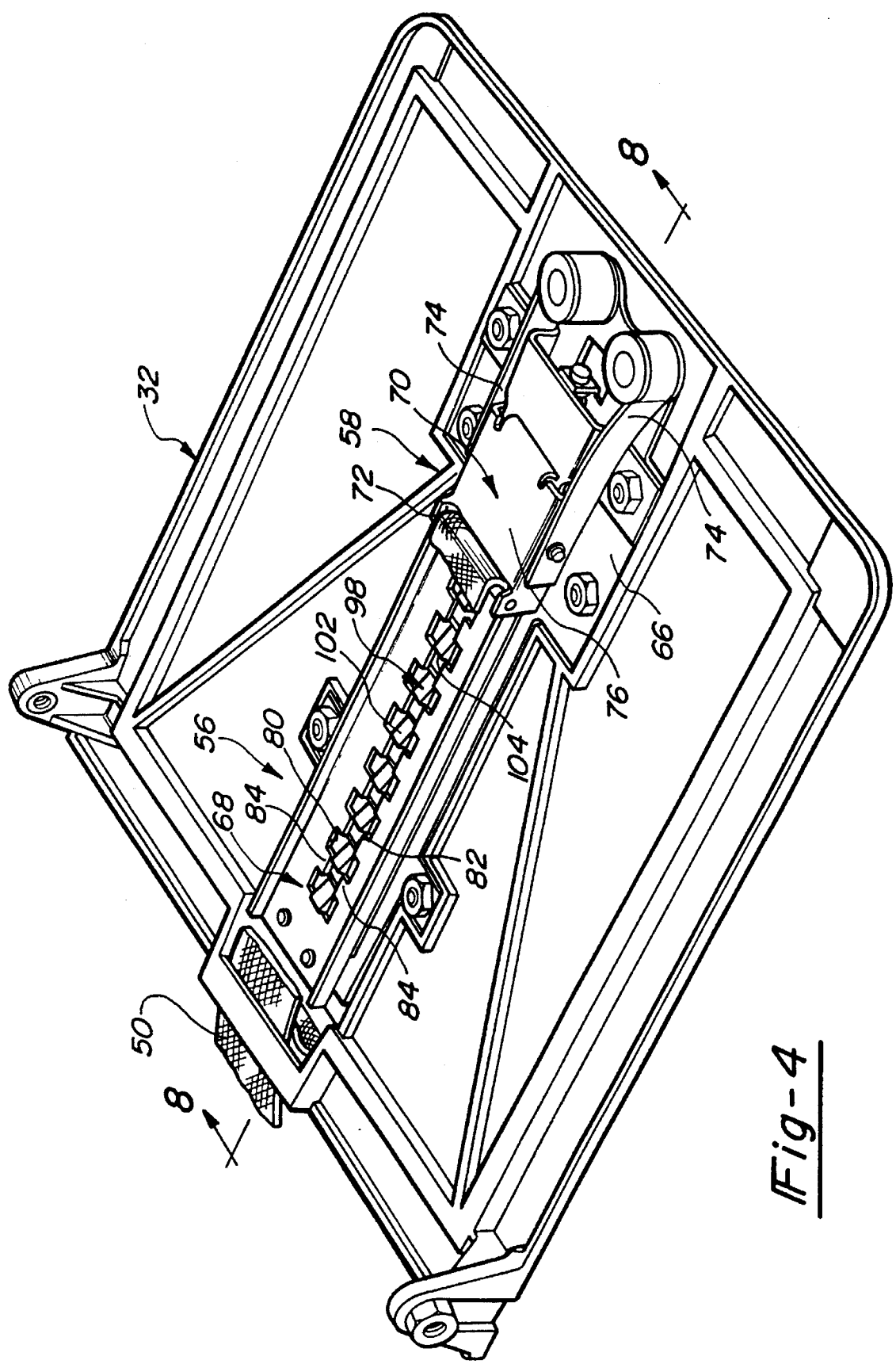

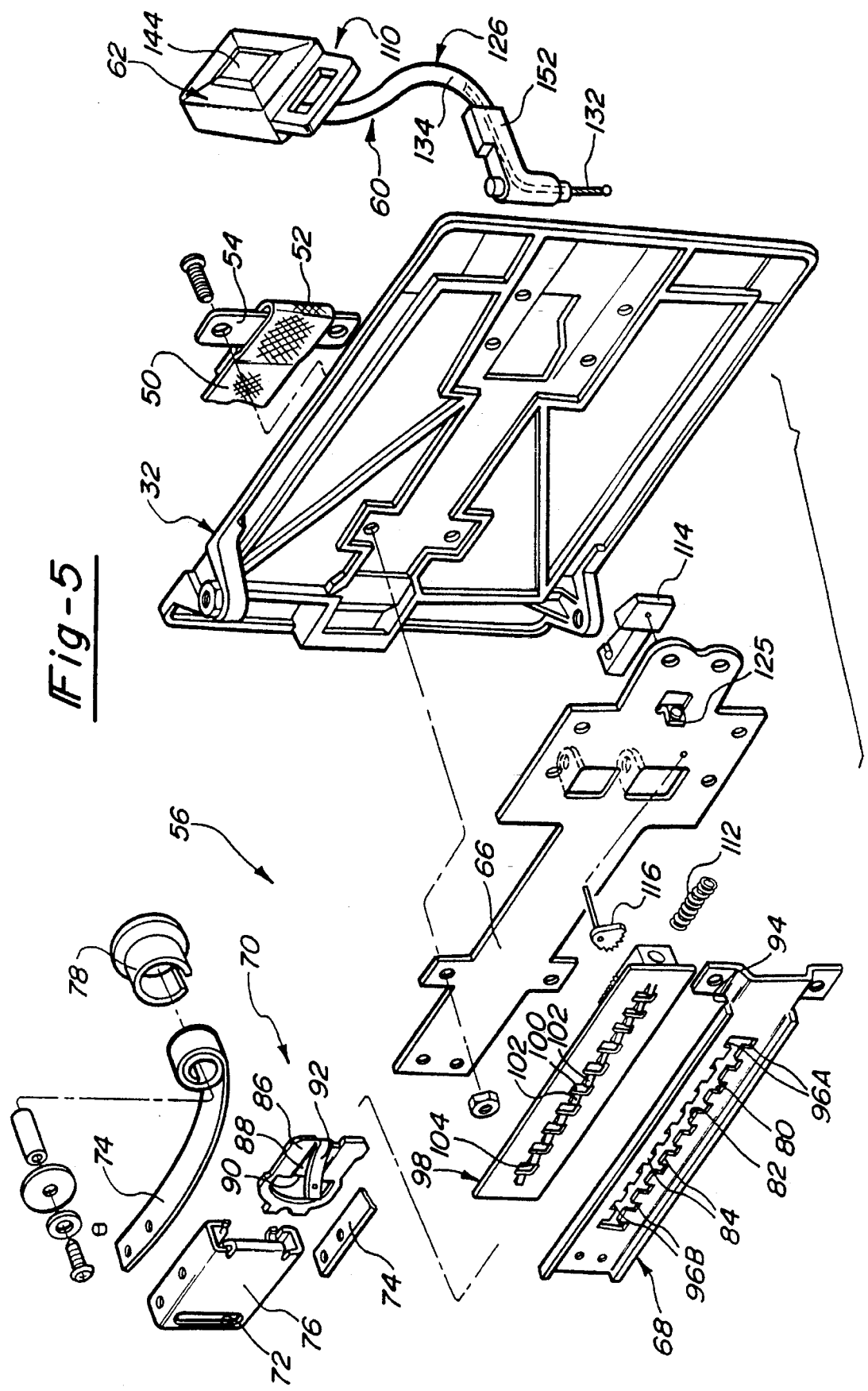

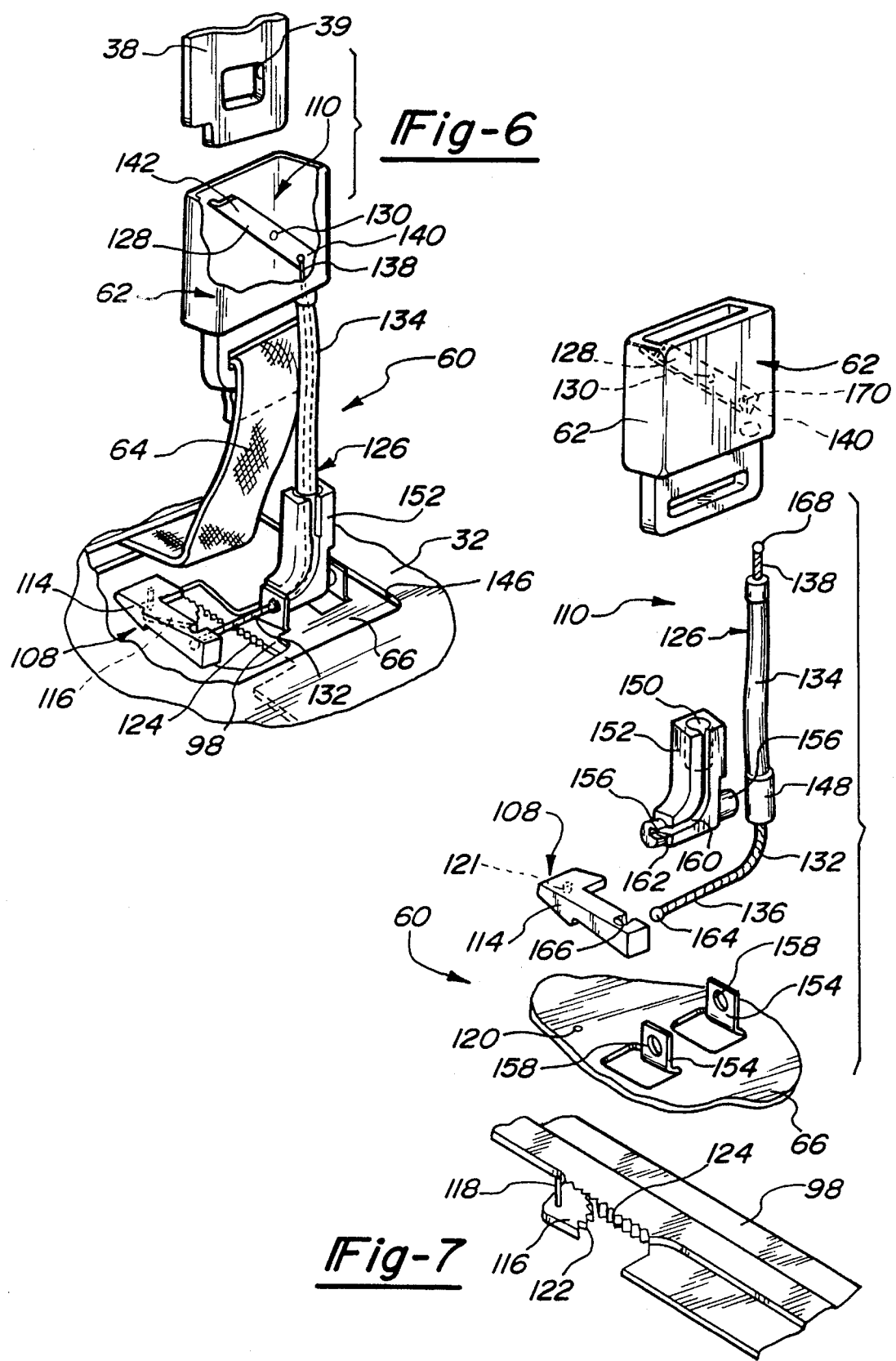

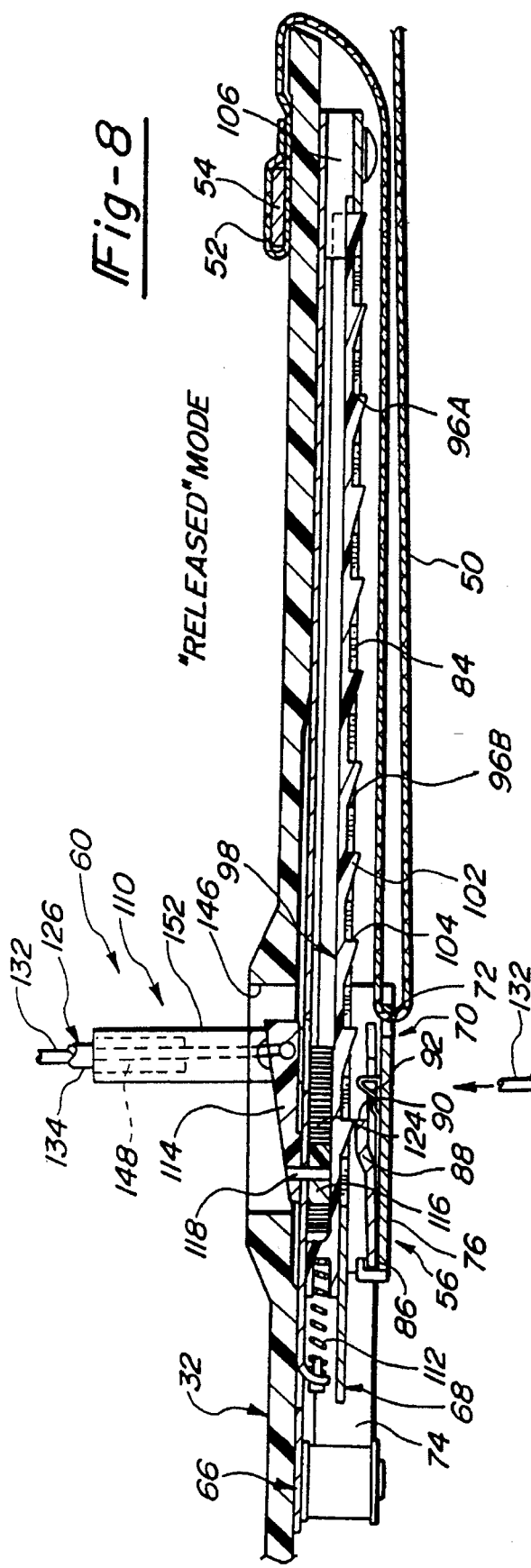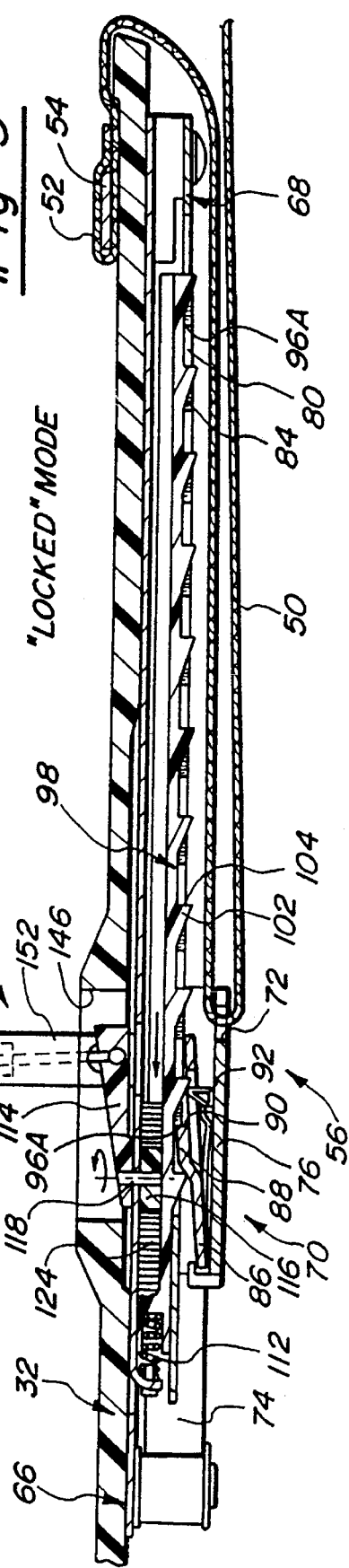

5,529,381

CABLE-ACTUATED LINEAR RETRACTOR FOR A CHILD SEAT

REFERENCE TO CO-PENDING APPLICATION

This application is a continuation-in-part of Ser. No. 07/981,874 filed Nov. 25, 1992, now U.S. Pat. No. 5,364,169.

BACKGROUND OF THE INVENTION

The present invention relates generally to passenger restraint systems and, more particularly, to safety belt retractors of the type used in vehicular seating applications.

Virtually all motor vehicles are now equipped with safety belt restraint systems for physically restraining the seat occupants when the vehicle is subjected to a high rate of deceleration which may occur, for example, during a motor vehicle collision. Traditionally, safety belt restraint systems include one of more rotary-type safety belt retractors which function to normally permit the belt webbing to be controllably withdrawn and retracted from a spring-biased spool assembly. It is also known to provide such rotary-type belt retractors with a locking mechanism that is selectively actuated in response to the occurrence of a predetermined event (i.e., latching of the belt buckle, vehicular deceleration forces above a maximum level, etc.) for preventing subsequent withdrawal of belt webbing, thereby restraining the seat occupant.

While conventional safety belt restraint systems are well-suited for restraining adult passengers, it is a common practice to use an auxiliary child seat having a belt-type harness restraint for children under a given age and weight. As is known, the child seat is placed on top of the vehicle seat and is secured thereto using the existing vehicular safety belt restraint system. It is also known to incorporate the aforementioned rotary-type belt retractor into the auxiliary child seat for preventing withdrawal of the harness restraint once the child is fastened therein. An example of such a locking arrangement for an auxiliary child seat is disclosed in U.S. Pat. No. 4,720,148.

In an effort to minimize the inconvenience associated with installing and/or stowing auxiliary child seats, some motor vehicles are now available with seating arrangements having one or more "fold-out" or integral child seats incorporated into the backrest of an otherwise conventional seat. Typically, such seating arrangements are adapted to accommodate an adult in a normal seated position when the integral child seat is stowed within the backrest. When needed, the integral child seat can be easily deployed to expose a belt-type harness restraint similar to that used with auxiliary child seats. Moreover, it is also common to incorporate a "tightening" mechanism into the integral child seat for adjusting the tension exerted on the child by the harness restraint. One commercially-available integral child seat employs a cinch-type belt tightening mechanism that can be manually-operated for adjusting the circuitous length of the harness restraint.

As an alternative to conventional cinch-type belt tightening devices, it is highly desireable to provide a "automatic" belt tightening mechanism which is operable for exerting a retractive force on the harness restraint while preventing withdrawal thereof in response to the child being buckled into the harness restraint. Such an automatic belt tightening mechanism offers greater convenience to the user, since no separate adjustment operations are required. Thus, it has been proposed to incorporate a conventional rotary-type belt retractor into an integral child seat for use as an automatic belt tightening mechanism. Unfortunately, in view of the need to provide comfort to adult seat occupants and preserve the overall cosmetic appearance of the seating arrangement when the integral child seat is in the stowed position, the available space for mounting such a conventional rotary-type belt retractor is severely limited.

SUMMARY OF THE INVENTION

Accordingly, the present invention is primarily directed to meeting the above object by providing a new and useful construction for a linear-type safety belt retractor which can be incorporated into virtually any vehicular safety belt restraint system or child restraint system. More specifically, it is an object of the present invention to provide a linear-type belt retractor which offers significant packaging and operational advantages over conventional rotary-type retractors.

A further object of the present invention is to provide the linear-type belt retractor with a locking mechanism that is operable in a first mode for permitting a belt webbing to be controllably withdrawn and retracted, and in a second mode for preventing withdrawal thereof. The linear-type belt retractor further includes actuation means for permitting the locking mechanism to be selectively shifted between the first and second operative modes. The actuation means is adapted to automatically shift the locking mechanism into the second operative mode in response to releasably fastening a belt-type harness restraint to a belt buckle member. In addition, the actuation mechanism is operable for automatically shifting the locking mechanism into the first operative mode upon subsequent release of the belt-type harness restraint from the belt buckle member.

As a related object, the linear-type belt retractor of the present invention is particularly well adapted for use as an automatic belt tightening device in child restraint seats and, more particularly, in fold-out integral child seats.

Additional objects, features and advantages of the present invention will become apparent to those skilled in the art from studying the written description and appended claims, taken in conjunction with the accompanying drawings.

BRIEF DESCRIPTION OF THE DRAWINGS

FIG. 4 is a bottom perspective view of the seat member shown in FIG. 3 illustrating a locking mechanism associated with the automatic linear-type belt retractor in greater detail;

FIG. 5 is an exploded perspective view of FIG. 4;

FIG. 6 is a top perspective view of a portion of the seat member shown in FIG. 3 illustrating a remote actuation mechanism associated with the automatic linear-type belt retractor in greater detail;

FIG. 7 is a exploded perspective view of FIG. 6;

FIG. 8 is an enlarged longitudinal section view, taken along line A—A of FIG. 4, showing the automatic linear-type belt retractor operating in a "released" mode when the belt-type harness restraint is unbuckled for allowing retraction and withdrawal thereof;

FIG. 9 is a view, similar to FIG. 8, showing the automatic linear-type belt retractor operating in a "locked" mode for inhibiting subsequent withdrawal of the harness restraint in response to buckling thereof;

DETAILED DESCRIPTION OF THE INVENTION

In general, the present invention is directed to an improved safety belt retractor which can be incorporated into vehicular safety belt restraint systems and child restraint systems (i.e., auxiliary child seats or integral child seats). More particularly, the present invention discloses a preferred construction for a linear-type safety belt retractor which offers significant packaging and operational advantages over conventional rotary-type belt retractors. Thus, it is to be understood that while a preferred embodiment of the linear-type belt retractor is hereinafter disclosed in association with one or more particular seating arrangements, such seating arrangements are merely exemplary representations of the type of environment to which the present invention is readily applicable.

Figure 1:
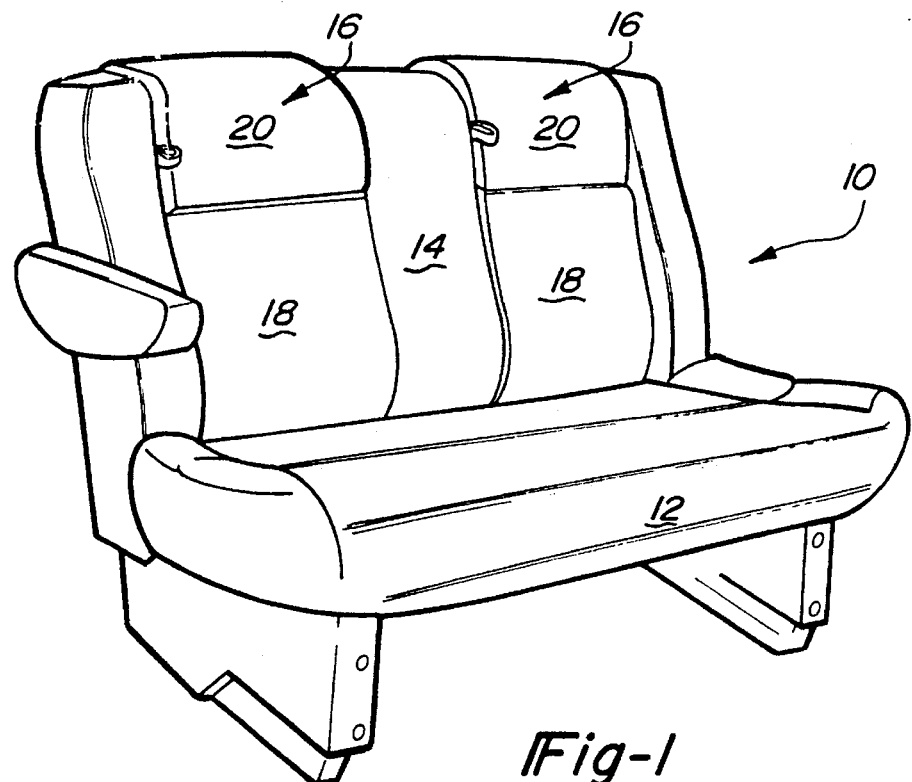
FIG. 1 is a perspective view of an exemplary vehicular seat having a pair of integral child seats shown in a "stowed" position.
Figure 2:
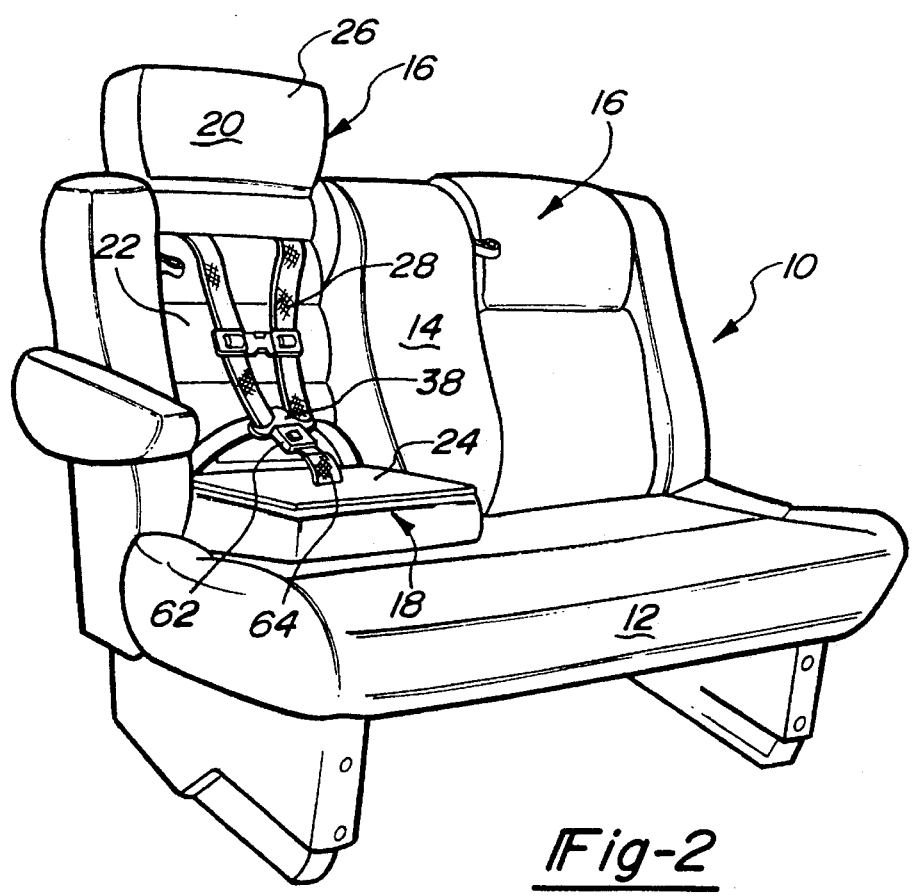
FIG. 2 is a perspective view of the vehicular seat shown in FIG. 1 with one of the integral child seats deployed to an "open" position.

Referring now to the drawings, and particularly FIGS. 1 and 2, an exemplary bench seat 10 of the type used in motor vehicles is shown. Bench seat 10 has a seat cushion 12, a backrest 14, and a pair of integral child seats 16 incorporated into backrest 14. Integral child seats 16 each include a fold-down seat member 18 and a fold-up head support 20. As shown in FIG. 1, bench seat 10 is in a normal adult seating position with integral child seats 16 stowed within backrest 14 in a "concealed" position. As illustrated in FIG. 2, when an integral child seat 16 is deployed to its fully "open" position, a cushioned back pad 22, a cushioned seat pad 24, a cushioned headrest 26 and a safety belt restraint system, shown as a five-point belt-type harness restraint 28, are exposed.

Figure 3:
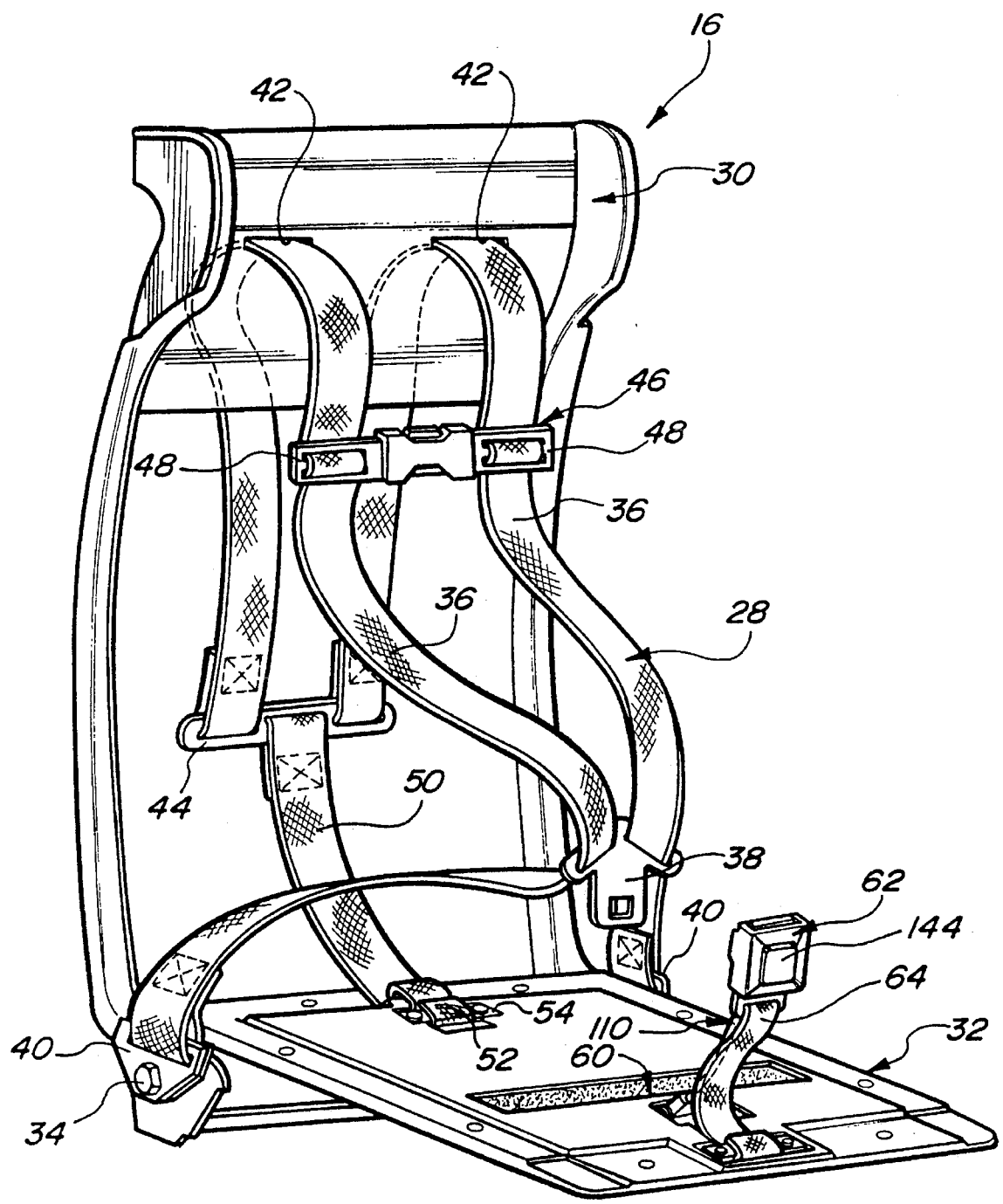
FIG. 3 is a perspective view of the underlying frame structure and belt-type harness restraint associated with the integral child seat and which is equipped with an automatic linear-type belt retractor according to a preferred embodiment of the present invention.

With particular reference now to FIG. 3, integral child seat 16 is shown in the "open" position with its upholstery and padding removed, as well as head support 20, to more clearly illustrate the present invention. More specifically, integral child seat 16 is shown to include a rigid seatback member 30 that is adapted for mounting to a structural frame portion of backrest 14, and a rigid seat pan 32 that is coupled to seatback member 30 for pivotable movement about pivot points 34. Harness restraint 28 is shown to include a pair of combination lap/shoulder straps, hereinafter referred to as safety belts 36, from which a tongue plate 38 is slidably supported. A first looped end of each safety belt 36 is anchored to seat pan 32 at pivot points 34 via anchor plates 40. The opposite end of each safety belt 36 extends through a slot 42 in seatback member 30 and is connected to an elongated connector bar 44. To assist in retaining a child within safety belts 36, harness restraint 28 also includes a slidable latching arrangement 46 having a pair of releasably engageable harness clips 48. As will be appreciated, the above-described underlying frame structure and belt-type harness restraint 28 for integral child seats 16 are generally conventional in construction and merely exemplary of one specific environment for which the present invention is applicable.

With continued reference to the drawings, a tension belt 50 is shown having one end coupled to connector bar 44 and its opposite end coupled to a rearward portion of seat pan 32. More particularly, a loop 52 formed at the second end of tension belt 50 is retained on a mounting plate 54 which, in turn, is fixed to seat pan 32. According to a preferred embodiment of the present invention, a linear-type belt retractor 56 is mounted to an underside surface of seat pan 32. In operation, linear-type belt retractor 56 is adapted to permit adjustment of the length of tension belt 50 which, in turn, causes a corresponding extension or retraction of safety belts 36 with respect to a child seated in integral child seat 16. In general, linear-type belt retractor 56 includes a locking mechanism 58 and a remote actuation mechanism 60 that is adapted to control actuation of locking mechanism 58 in response to whether tongue plate 38 is latched to, or released from engagement with, a belt buckle member 62. Moreover, a crotch belt 64 is shown coupling seat belt buckle 62 to seat pan 32 to assist in resisting the application of tension loading on remote actuation mechanism 60.

As best seen from FIG. 4 and 5, locking mechanism 58 includes an elongated mounting plate 66 that is fixed to seat pan 32, an elongated lock plate 68 fixed to mounting plate 66, and a latch assembly 70 that is retained for selective reciprocal longitudinal movement on lock plate 68. Preferably, locking mechanism 58 is pre-assembled onto mounting plate 66 for modular assembly onto seat pan 32. In addition, an intermediate portion of tension belt 50 is "doubled-back" on itself and slidably retained on latch assembly 70 via slot 72 such that reciprocal longitudinal movement of latch assembly 70 results in a corresponding increase or decrease (i.e., depending on the direction of travel of latch assembly 70 on lock plate 68) in the length of tension belt 50. Thus, linear movement of latch assembly 70 in a first direction (i.e., toward the rear edge of seat pan 32) permits safety belts 36 to be withdrawn from integral child seat 16. Likewise, linear movement of latch assembly 70 in an opposite or second direction acts to retract safety belts 36 into integral child seat 16. A roller (not shown) may be journally supported within slot 72 to reduce friction upon tension belt 50 sliding thereon. As a related feature, since tension belt 50 is "doubled-back" on itself due to its slidable connection to latch assembly 70, a predetermined amount of linear movement of latch assembly 70 results in a change in the "effective" length of tension belt 50 that has a magnitude equal to twice the predetermined amount. This feature is desireable in that it contributes to the overall compact nature of linear-type belt retractor 56.

According to the particular embodiment shown, locking mechanism 58 is arranged to normally operate in a "released" mode for permitting both withdrawal and retraction of belt-type harness restraint 28 when tongue plate 38 is unlatched from belt buckle 62. More particularly, locking mechanism 58 is adapted to permit movement of latch assembly 70 in both the first and second directions when operating in the released mode. However, it is preferable that latch assembly 70 be normally biased in the second direction for automatically retracting harness restraint 28 when integral child seat 16 is not being used. To this end, a pair of coiled rewind springs 74 are provided for normally urging latch assembly 70 in the second direction so as to continuously exert a retractive force on safety belts 36. As best seen from FIGS. 4 and 5, a first end of each rewind spring 74 is fixed to one lateral side of a slide bracket 76 while the opposite ends thereof are each retained on a spring retainer 78 supported from mounting plate 66.

As will be detailed, remote actuation mechanism 60 is automatically actuated in response to tongue plate 38 being inserted and releasable latched to belt buckle member 62 for shifting locking mechanism 58 into a "locked" mode. When locking mechanism 58 is in its locked mode, latch assembly 70 is inhibited from moving in the first direction, thereby inhibiting subsequent withdrawal of safety belts 36. However, locking mechanism 58 is adapted to still permit latch assembly 70 to move in the second direction when operating in the "locked" mode for retracting safety belts 36 due to the biasing exerted by rewind springs 74 on slide bracket 76. This automatic belt tightening feature is desireable in that belt-type harness restraint 28 is automatically retracted to a taut position against a child seated in child seat 16 following buckling of tongue plate 38 into buckle member 62.

Turning to FIGS. 4 through 9, a preferred construction for linear-type belt retractor 56 will now be described in greater detail. From FIG. 4, it can be seen that linear-type belt retractor 56 is mounted in a compact arrangement within a longitudinal channel defined between a pair of laterally-spaced transverse flanges that are formed on the underside surface of seat pan 32. In particular, mounting plate 66 is fixed to seat pan 32 within the reinforced longitudinal channel using suitable fasteners. A generally rectangular cover (not shown) is provided for enclosing linear-type belt retractor 56, thereby isolating movable latch assembly 70 from the padding and upholstery supported on the underside of seat pan 32. In addition, lock plate 68 is shown to include a series of equally-spaced and longitudinally aligned locking apertures 80. Lock plate 68 also includes an elongated longitudinal slot 82 formed between adjacent locking apertures 80 which cooperates therewith for defining opposed sets of inwardly-facing teeth 84 that have a generally rectangular profile. As previously noted, latch assembly 70 is retained for selective reciprocal longitudinal movement with respect to lock plate 68 for adjusting the effective length of tension belt 50 and, in turn, safety belts 36. To this end, slide bracket 76 is slidably mounted on lock plate 68 and a spring-biased latch member 86 is retained within slide bracket 76. Spring-biased latch member 86 is positioned below and adjacent to lock plate 68 and includes a longitudinally-extending projection 88 that is aligned with locking apertures 80 and elongated slot 82 on lock plate 68. However, projection 88 has a width dimension that is greater than the width of elongated slot 82, but less than the width of locking apertures 80. Moreover, projection 88 is tapered or ramped upwardly toward lock plate 68 and terminates in a rear latch face 90. A biasing member, such as leaf spring 92, is positioned between latch member 86 and a planar segment of slide bracket 76 for normally biasing latch member 86 toward lock plate 68. Thus, projection 88 is normally biased by leaf spring 92 into a locking aperture 80 such that any attempt to withdraw safety belts 36 when locking mechanism 58 is in the locked mode causes rear latch face 90 of projection 88 to lockingly engage a first set of tooth edges 96A which define the rearward transverse edge of such locking aperture 80. In this position, latch assembly 70 is locked against linear movement in the first direction for inhibiting extension of tension belt 50 and, in turn, extension of safety belts 36.

A noted feature of linear-type belt retractor 56 is the ability of latch assembly 70 to move in the second direction when locking mechanism 58 is in the "locked" mode, thereby permitting rewind springs 74 to exert the continuous retractive force on tension belt 50 and, in turn, safety belts 36. As such, any movement of latch assembly 70 in the second direction causes tapered projection 88 to engage a second set of tooth edges 96B which define the forward transverse edge of each locking aperture 80. However, the tapered profile of longitudinal projection 88 is adapted to permit rewind springs 74 to forcibly urge latch member 86 to cam or "ride over" tooth edges 96B for releasing projection 88 from nested engagement within one of locking apertures 80. Thereafter, latch member 86 rides over an adjacent pair of teeth 84 until projection 88 is again biased into the next sequential locking aperture 80. Thus, latch assembly 70 can move in the second direction by sequentially ratcheting into and out of adjacent locking apertures 80 for retracting tension belt 50 and, in turn, safety belts 36. As will be appreciated, this ratcheting action will continue until safety belts 36 are taut against the child and projection 88 is again biased into and retained within one of locking apertures 80 in lock plate 68. Alternatively, without a child seated in integral child seat 16, rewind springs 74 will cause latch assembly 70 to move (i.e., sequentially ratchet) in the second direction for fully retracting safety belts 36 until slide bracket 76 abuts a transverse blocking surface 94 formed on lock plate 68 so as to define a forward stop position, whereat the minimum effective length of tension belt 50 is established.

As noted, when tongue plate 38 is unbuckled from belt buckle member 62, locking mechanism 58 is automatically shifted from the locked mode into the released mode for permitting linear movement of latch assembly 70 in both directions. As a result of tongue plate 38 being released, projection 88 of latch member 86 is caused to be released from nested engagement within a particular locking aperture 80. To this end, means are provided for selectively displacing latch member 86, in opposition to leaf spring 92, for maintaining latch face 90 in a position displaced from tooth edges 96A of locking apertures 80, thereby establishing the released mode. Accordingly, remote actuation mechanism 60 includes an elongated release plate 98 that is supported for longitudinal sliding movement between a "non-actuated" position (FIGS. 4 and 8) and an "actuated" position (FIG. 9). Release plate 98 includes a series of equally-spaced apertures 100 and longitudinal cam projections 102 that are sequentially formed between adjacent apertures 100. Moreover, cam projections 102 are rearwardly and downwardly tapered and have a width dimension permitting rectilinear movement thereof within locking apertures 80 and elongated slot 82 of lock plate 68. In addition, the lower most rearward edge 104 of each cam projection 102 is adapted to extend slightly below the planar lower surface of teeth 84.

Remote actuation mechanism 60 is operable for shifting locking mechanism 58 from the released mode to the locked mode in response to longitudinal sliding movement of release plate 98 from the non-actuated position to the actuated position. In the non-actuated position, release plate 98 causes latch member 86 to be resiliently depressed in opposition to leaf spring 92 such that latch face 90 is retained in the position disengaged from tooth edges 96A of lock plate apertures 80, thereby permitting linear movement of latch assembly 70 in both of the first and second directions. Thus, when release plate 98 is in its non-actuated position, latch face 90 of latch member 86 is able to slide over teeth 84, thereby maintaining locking mechanism 58 in the released mode. As best seen from FIGS. 4 and 8, when release plate 98 is in the non-actuated position, cam projections 102 are located within locking apertures 80 such that tapered ends 104 thereof extend beyond the plane of teeth 84 for camming engagement with projection 88 of latch member 86. In this manner, latch face 90 of projection 88 is inhibited from lockingly engaging first tooth edges 96A of apertures 80, thereby facilitating unrestricted movement of latch assembly 70 on lock plate 68 in the first direction. As noted, such linear movement of latch assembly 70 in the first direction causes an increase in the effective length of tension belt 50 which results in a corresponding withdrawal of safety belts 36. Upon continued withdrawal of safety belts 36, latch assembly 70 eventually engages a fixed member at the rear of lock plate 68, such as rear stop block 106, for defining a rear stop position establishing the maximum effective length of tension belt 50.

Movement of release plate 98 from its non-actuated position to its actuated position in response to latched engagement of tongue plate 38 within buckle member 62 causes cam projections 102 to move out of alignment within locking apertures 80 and into alignment with elongated slot 82. As such, leaf spring 92 is permitted to bias projection 88 on latch member 86 into locked engagement within one of locking apertures 80. Thus, any subsequent attempt to withdraw safety belts 36 causes rear latch face 90 of projection 88 to lockingly engage the first set of tooth edges 96A. In this position, locking mechanism 58 is in the locked mode such that latch assembly 70 is locked against linear movement in the first direction for inhibiting extension of tension belt 50 and, in turn, extension of safety belts 36. As noted, locking mechanism 58 is operable in the locked mode to permit movement of latch assembly 70 in the second direction for permitting rewind springs 74 to exert the continuous retractive force on harness restraint 28.

To provide means for automatically moving release plate from the non-actuated position to the actuated position in response to complete insertion and latched engagement of tongue plate 38 within belt buckle member 62, remote actuation mechanism 60 further includes a pawl assembly 108 that is supported for pivotable movement on mounting plate 66, and an actuator device 110 for causing pawl assembly 108 to rotate between a first position and a second position. As best seen from FIGS. 6 and 7, pawl assembly 108 includes a lever segment 114 and a toothed sector 116. A post 118 extends through an aperture 120 in mounting plate 66 and is retained within a bore 121 formed in lever segment 114 for fixedly coupling lever segment 114 to toothed sector 116. In addition, teeth 122 of sector 116 are meshed with a toothed rack 124 formed on one lateral edge of release plate 98. Due to the meshed engagement between toothed sector 116 and toothed rack 124, pivotable movement of pawl assembly 108 causes linear movement of release plate 98 and visa versa. Thus, when pawl assembly 108 is in its first position (FIG. 6), release plate 98 is concurrently retained in its non-actuated position. To provide means for normally biasing release plate 98 toward its non-actuated position, a coil spring 112 is operably retained between the forward end of release plate 98 and a stationary flange 125 on mounting plate 66. As such, coil spring 112 concurrently biases pawl assembly 108 toward its first position. As will be appreciated, when pawl assembly 108 is pivoted to its second position, in opposition to the biasing of coil spring 112, release plate 98 is caused to concurrently move to its actuated position.

To provide means for automatically rotating pawl assembly 108 from its first position to its second position upon insertion of tongue plate 38 into buckle member 62, actuator device 110 is shown to include an operator 128 supported within buckle member 62 for pivotable movement about a pivot 130, and a bowden cable assembly 126 that is operably installed between lever segment 114 of pawl assembly 108 and operator 128. More particularly, cable assembly 126 includes an axially movable core member or cable 132 that is housed within an outer sheathing or conduit 134 and which has a first end 136 coupled to lever segment 114 of pawl assembly 108 and a second end 138 coupled to a first end 140 of pivotable operator 128. As previously noted, coil spring 112 acts on release plate 98 for normally biasing release plate 98 into the non-actuated position which, in turn, causes pawl assembly 108 to be biased into its first position (FIG. 6) due to the meshed engagement between toothed rack 124 and sector teeth 122.

FIG. 6 illustrates the various components of remote actuation mechanism 60 with release plate 98 biased by coil spring 112 into the non-actuated position and pawl assembly 108 concurrently biased into its first position. To provide enhanced clarity, the latching components of buckle member 62 have been deleted. However, it will be appreciated that, with the exception of operator 128, buckle member 62 is an otherwise conventional push-button type device having a latching arrangement that is operable for releasably engaging aperture 39 of tongue plate 38. As can be seen, pivotable movement of operator 128 about pivot 130 causes axial movement of cable 132 for pivoting pawl assembly 108 which, in turn, causes linear movement of release plate 104. To this end, an end portion of tongue plate 38 is adapted to act on a second end 142 of operator 128 for causing pivotable movement of operator 128 about pivot 130 (i.e., counterclockwise in FIG. 6) for axially displacing cable 132 such that pawl assembly 108 is rotated from its first position to its second position (i.e., rotated counterclockwise in FIG. 6). Such rotation of pawl assembly 108 toward its second position causes toothed sector 116 to linearly move release plate 98 from its non-actuated position into its actuated position. Moreover, once tongue plate 38 is latched within buckle member 62, release plate 98 is retained in the actuated position, in opposition to the biasing of coil spring 112, for placing locking mechanism 58 in its locked mode. Likewise, release of tongue plate 38 from belt buckle 62 (such as by conventional depression of a push button 144) permits coil spring 112 to forcibly urge release plate 98 to move toward its non-actuated position which, in turn, causes pawl assembly 108 to concurrently rotate from its second position toward its first position. Thus, remote actuation of locking mechanism 58 is automatic and dependent on the buckled relationship between buckle member 62 and tongue plate 38.

As most clearly seen from FIGS. 6 through 9, cable assembly 126 extends upwardly through an opening 146 in seat pan 32 for permitting belt buckle 62 to be located remotely from seat pan 32. To accommodate twisting of cable assembly 126 and buckle member 62, a lower cylindrical end 148 of conduit 134 is journally retained in a cylindrical bore 150 formed in an enlarged body member 152. To provide means for permitting pivotable movement of cable assembly 126 and buckle member 62 relative to seat pan 32, body member 152 is mounted for pivotable movement between a pair of upstanding flanges 154 formed on mounting plate 66. More specifically, body member 152 includes a pair of outwardly extending pins 156 and which are journally retained in aligned apertures 158 formed in upstanding flanges 154. Moreover, an intermediate portion of cable 132 is retained in a channel 160 formed in body member 152 and extends through a slot 162 formed in one of pins 156 for facilitating coupled engagement of first end 136 of cable 132 with lever segment 114 of pawl assembly 108. Channel 160 is generally arcuate such that the portion of cable 132 extending through slot 162 is oriented along the pivot axis of apertures 158. This arrangement is effective in inhibiting bending of cable 132 during pivotable movement of cable assembly 126 relative to mounting plate 66. Moreover, conduit 134 can be pivoted about flanges 154 relative to seat pan 32 without causing excessive twisting of cable 132. In addition, a spherical ferrule 164 is provided at first end 136 of cable 132 and is retained in a corresponding socket 166 formed in the distal end of lever segment 114 of pawl assembly 108. A similar ferrule 168 and socket 170 arrangement is shown for coupling second end 138 of cable 132 to first end 140 of pivotable operator 128. Such an arrangement prevents cable 132 from becoming twisted within conduit 134.

As an additional feature, a fail-safe arrangement is provided for automatically shifting locking mechanism 58 in its locked mode in the event that cable 132 becomes uncoupled from lever segment 114 of pawl assembly 108. More particular, upon cable 132 becoming uncoupled from lever segment 114, the biasing of coil spring 112 is adapted to forcibly urge release plate 98 to advance rearwardly until the rearmost cam projection 102 engages a terminal edge 172 of slot 82 in lock plate 68. Upon such engagement, the remaining cam projections 102 are aligned within slot 82 of lock plate 68, thereby causing latch member 86 to be lockingly retained within one of locking apertures 80 to prevent subsequent movement of latch assembly 70 in the first direction. As previously noted, crotch belt 64 is provided between seat pan 32 and belt buckle 62 and is of a predetermined length for inhibiting the application of tension loading on cable assembly 126.

Figures 10, 11:
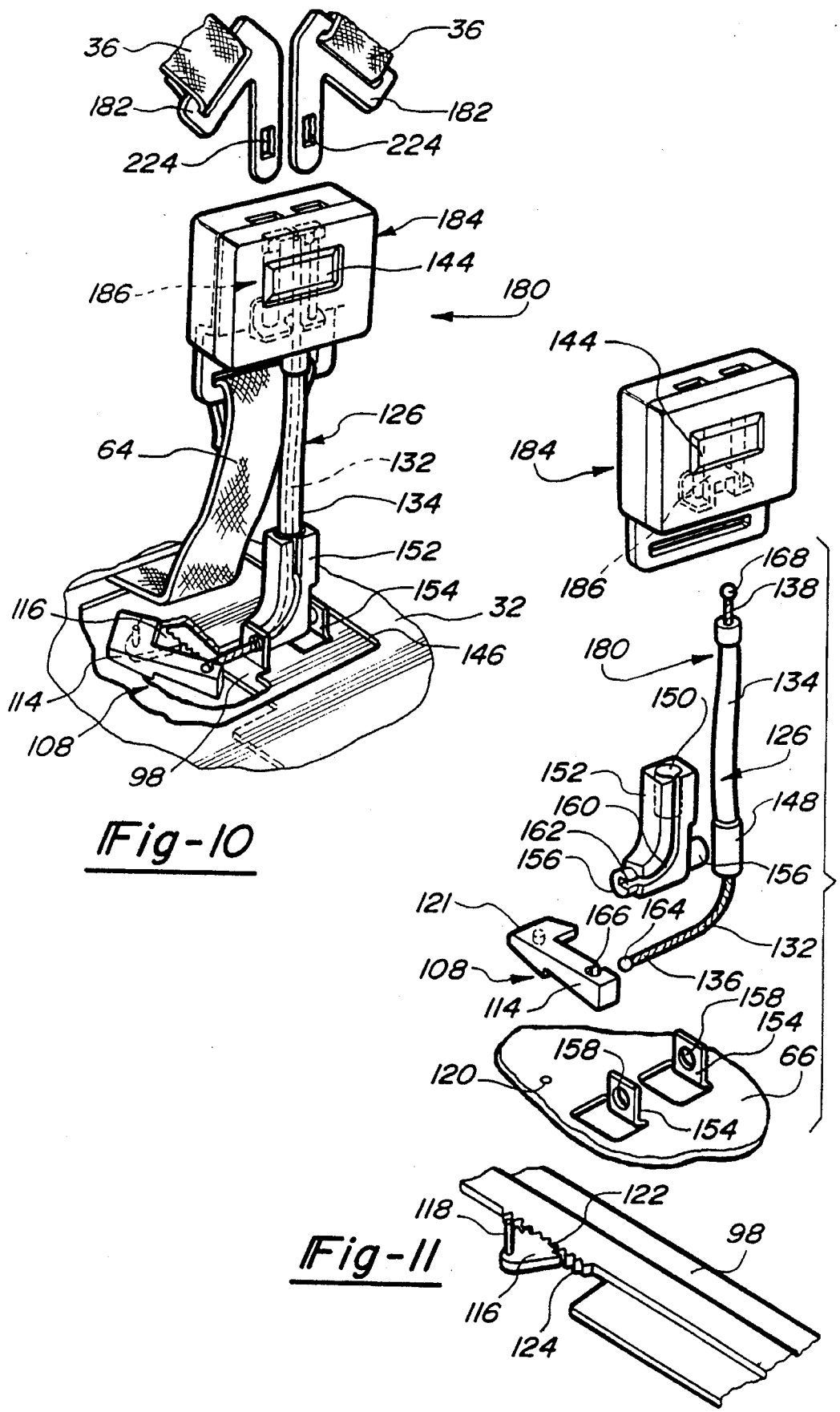
FIG. 10 is a perspective view, similar to FIG. 6, showing an alternative embodiment for the remote actuation mechanism of the present invention.
FIG. 11 is an exploded perspective view of FIG. 10.
Figure 12:
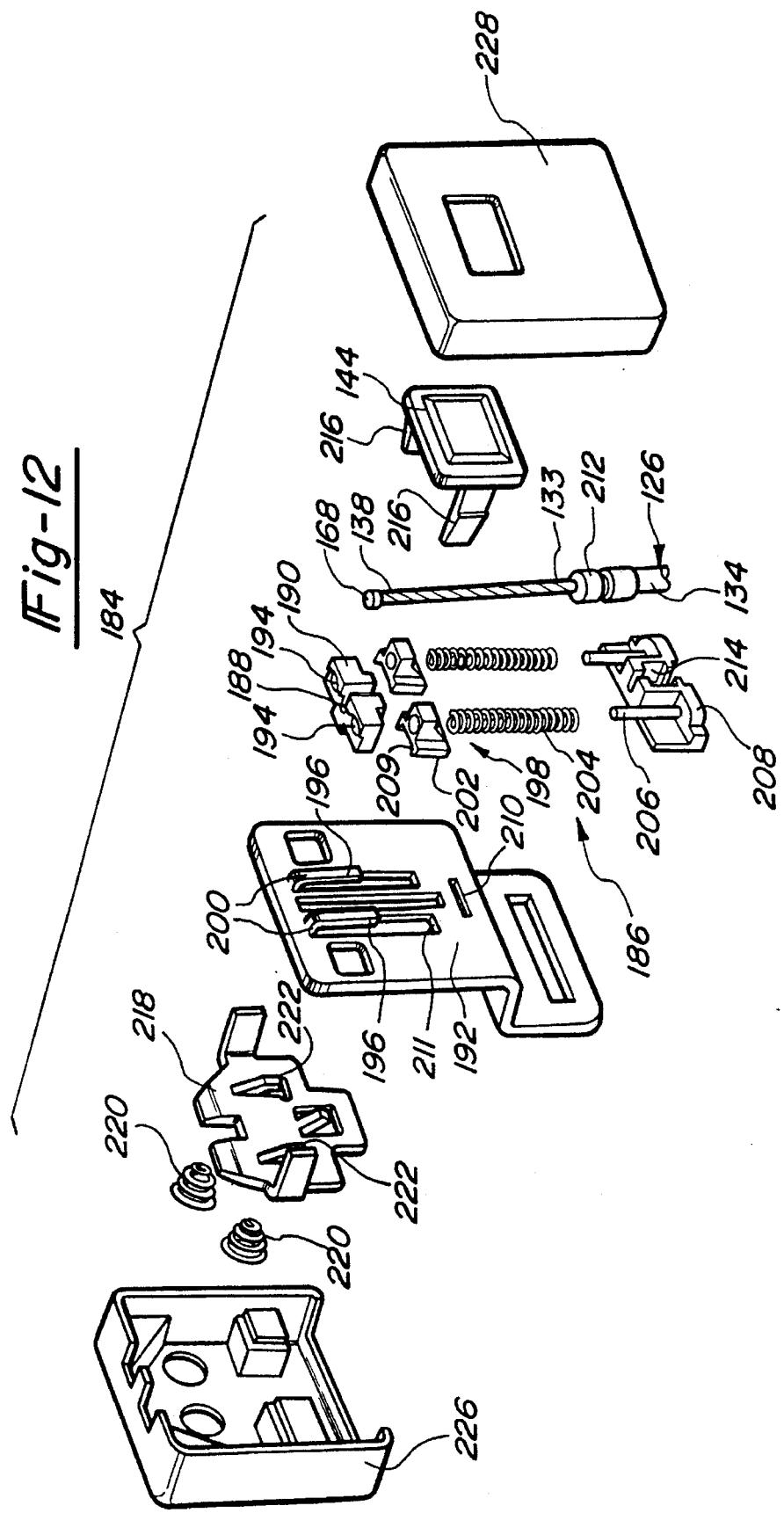
FIG. 12 is an exploded perspective view of the belt buckle member shown in FIGS. 10 and 11.

With particular reference to FIGS. 10 through 12, an alternative embodiment of a remote actuation mechanism 180 is disclosed which is adapted for use in linear-type belt retractor 56 for controlling actuation of locking mechanism 58. In general, remote actuation mechanism 180 includes many components common to remote actuation mechanism 60 and is similarly operable for shifting release plate 98 between its actuated and non-actuated positions in response to the buckled relationship between a tongue plate and a belt buckle member. Thus, like reference numerals are used to identify those components of remote actuation mechanism 180 which are identical, or similar in function, to the previously described components of remote actuation mechanism 60.

According to the particular embodiment shown in FIGS. 10 through 12, remote actuation mechanism 180 is adapted to automatically shift locking mechanism 58 into the locked mode in response to a pair of tongue plates 182 being inserted and releasably latched to a belt buckle member 184 for inhibiting latch assembly 70 from moving in the first direction, thereby inhibiting the subsequent withdrawal of safety belts 36. In addition, locking mechanism 58 is still adapted to permit latch assembly 70 to move in the second direction when operating in its locked mode for retracting safety belts 36 due to the biasing exerted thereon by rewind springs 74. Furthermore, when tongue plates 182 are unbuckled from belt buckle member 184, locking mechanism 58 is automatically shifted from the locked mode into the released mode for permitting linear movement of latch assembly 70 in both directions.

In its most basic sense, remote actuation mechanism 180 includes a spring-loaded operator assembly 186 that is incorporated into belt buckle member 184 in substitution for operator 128 of buckle member 62 and which is operably coupled to pawl assembly 108 via cable assembly 126. As best seen from the exploded view of belt buckle member 184 shown in FIG. 12, spring-loaded operator assembly 186 is adapted to act on second end 138 of cable 132 for controlling axial movement thereof and, in turn, the rotated position of pawl assembly 108. More particularly, ferrule 168 is retained in a socket 188 formed in a retainer block 190 which is supported for sliding reciprocable movement on a stationary mounting plate 192. Retainer block 190 is formed to include a pair of laterally-spaced apertures 194 which each surround one of a pair of elongated slide rails 196 extending from plate 192, thereby facilitating sliding movement of retainer block 190 thereon. A pair of biasing assemblies 198 are provided which act on retainer block 190 for normally biasing retainer block 190 upwardly against a traverse stop ledge portion 200 of each slide rail 196. Each biasing assembly 198 includes an apertured slide block 202 supported for sliding movement on slide rail 196 below retainer block 190, and a coil spring 204 having a first end coaxially retained on slide rail 196 and abutting slide block 202 and a second end retained on a post 206 of a stationary spring retainer 208. Spring retainer 208 is fixed to mounting plate 192 in any suitable manner, such as via insertion of a transverse lug (not shown) into an aperture 210. Moreover, a lug portion 209 of each slide block 202 is positioned behind plate 192 such that the apertured portion thereof extends through an elongated slot 211 and is retained for sliding movement on rail 196. In addition, an enlarged end portion 212 of conduit 134 is retained in a recessed cavity 214 formed in spring retainer 208.

As is best seen from FIG. 12, buckle member 184 includes a push button 144 of the type having legs 216 which act on a latch plate 218. In operation, depression of push button 144 causes latch plate 218 to be displaced, in opposition to the biasing of helical springs 220, for releasing latch faces 222 of ramped locking lugs 224 from retention within tongue plate apertures 226, thereby permitting subsequent release of tongue plates 182 from buckle member 184. In addition, latch plate 218 also includes a central ramped lug 228 that is aligned with a central slot 230 formed in plate 192. A rear stepped portion 232 of retainer block 190 extends into central slot 230 and is adapted to ride over ramped lug 228 of tongue plates 182 upon downward sliding movement of retainer block 190. Upon latch faces 222 of latch plate 218 being lockingly retained in tongue plate apertures 226, stepped portion 232 of retainer block 190 moves past the distal end of central ramped lug 228 for subsequently locking retainer block 190 against movement toward ledge portions 200 in opposition to springs 204. In this manner, coil springs 204 are inhibited from attempting to push tongue plates 182 out of buckle member 184. However, upon depression of push button 144, retainer block stepped portion 232 is disengaged from latch plate central lug 228, whereby coil springs 204 are subsequently permitted to assist in pushing tongue plates 182 out of buckle member 184. As seen, the latching and operator components are housed within a casing defined by a pair of engageable casing portions 240 and 242.

Remote actuation mechanism 180 is operable for shifting locking mechanism 58 from its released mode to its locked mode in response to longitudinal sliding movement of release plate 98 from its non-actuated position to its actuated position. In particular, when tongue plates 182 are unlatched from buckle member 184, biasing assemblies 198 work in concert to urge retainer block 190 into engagement with stop ledges 200 such that cable 132 holds pawl assembly in a first position (FIG. 10). In this position, release plate 98 is held in its non-actuated position in opposition to the biasing of coil spring 112 acting thereon. As previously described, in the non-actuated position, release plate 98 causes latch member 86 to be resiliently depressed in opposition to leaf spring 92 such that latch face 90 is retained in a position disengaged from lock plate apertures 80, thereby permitting linear movement of latch assembly 70 in both of the first and second directions. Thus, when release plate 98 is in its non-actuated position, latch face 90 of latch member 86 is able to slide over teeth 84, thereby maintaining locking mechanism 58 in the released mode. Moreover, when release plate 98 is in the non-actuated position, cam projections 102 are located within locking apertures 80 such that tapered ends 104 thereof extend beyond the plane of teeth 84 for camming engagement with projection 88 of latch member 86. In this manner, latch face 90 of projection 88 is inhibited from lockingly engaging first tooth edges 96A of apertures 80, thereby facilitating unrestricted movement of latch assembly 70 on lock plate 68 in the first direction. As noted, such linear movement of latch assembly 70 in the first direction causes an increase in the effective length of tension belt 50 which results in a corresponding withdrawal of safety belts 36. Upon continued withdrawal of safety belts 36, latch assembly 70 eventually engages a fixed member at the rear of lock plate 68, such as rear stop block 106, for defining the rear stop position.

Movement of release plate 104 from its non-actuated position to its actuated position occurs in response to latched engagement of tongue plates 182 within buckle member 184. More particularly, the distal end of each tongue plate 182 is adapted to engage its respective one of lug portions 209 of slide blocks 202 upon insertion into buckle member 184. Upon continued insertion of tongue plates 182, slide blocks 202 are forcibly urged to slide downwardly on slide rails 196 in opposition to the biasing of coil springs 204. Concurrently, coil spring 112 is permitted to move release platte 98 toward its actuated position due to the reduced biasing exerted on retainer block 190 by coil spring 204 of biasing assemblies 198. Due to their toothed engagement, such movement of release plate 98 causes pivot assembly 108 to rotate to a second position (i.e., counterclockwise in FIG. 10) such that cable 132 acts on retainer block 190 for pulling it downwardly into maintained engagement with slide blocks 202 of the compressed biasing assemblies 198. Thus, it will be appreciated that the biasing of coil springs 204 is greater than the biasing of coil spring 112 for normally retaining release plate in its non-actuated position when tongue plates 182 are released from buckle member 184. Moreover, due to the use of a separate biasing assemblies 198 for each tongue plate 182, each coil spring 204 is individually stronger than coil spring 112 for preventing movement of retainer block 190 until the second tongue plate is inserted following insertion of the other thereof. While shown with two tongue plates 182, it is to be understood that a common tongue plate, similar to tongue plate 38, could be used with only slight modification to buckle member 184.

With release plate 92 in the actuated position, cam projections 102 are positioned out of locking apertures 80 and into alignment with elongated slot 82. As such, leaf spring 92 is permitted to bias projection 88 on latch member 86 into locked engagement within one of locking apertures 80. Thus, any subsequent attempt to withdraw safety belts 36 causes rear latch face 90 of projection 88 to lockingly engage the first set of tooth edges 96A. In this position, locking mechanism 58 is in the locked mode such that latch assembly 70 is locked against linear movement in the first direction for inhibiting extension of tension belt 50 and, in turn, extension of safety belts 36. As noted, locking mechanism 58 is, however, operable in the "locked" mode to permit movement of latch assembly 70 in the second direction for exerting a continuous retractive force on harness restraint 28.

As previously disclosed, due to the meshed engagement between toothed sector 116 of pawl assembly 108 and toothed rack 124 of release plate 98, pivotable movement of pawl assembly 108 causes linear movement of release plate 98. Similarly, linear movement of release plate 98 causes pivotable movement of pawl assembly 108. Thus, when pawl assembly 108 is in the first position (FIG. 10), release plate 98 is concurrently retained in its non-actuated position. Similarly, when release plate 98 is urged by coil spring 112 to its actuated position, pawl assembly 108 is concurrently pivoted to its second position. As noted, coil spring 112 is adapted to normally bias release plate 98 toward its actuated position which, in turn, concurrently biases pawl assembly 108 toward its second position.

Figure 13:
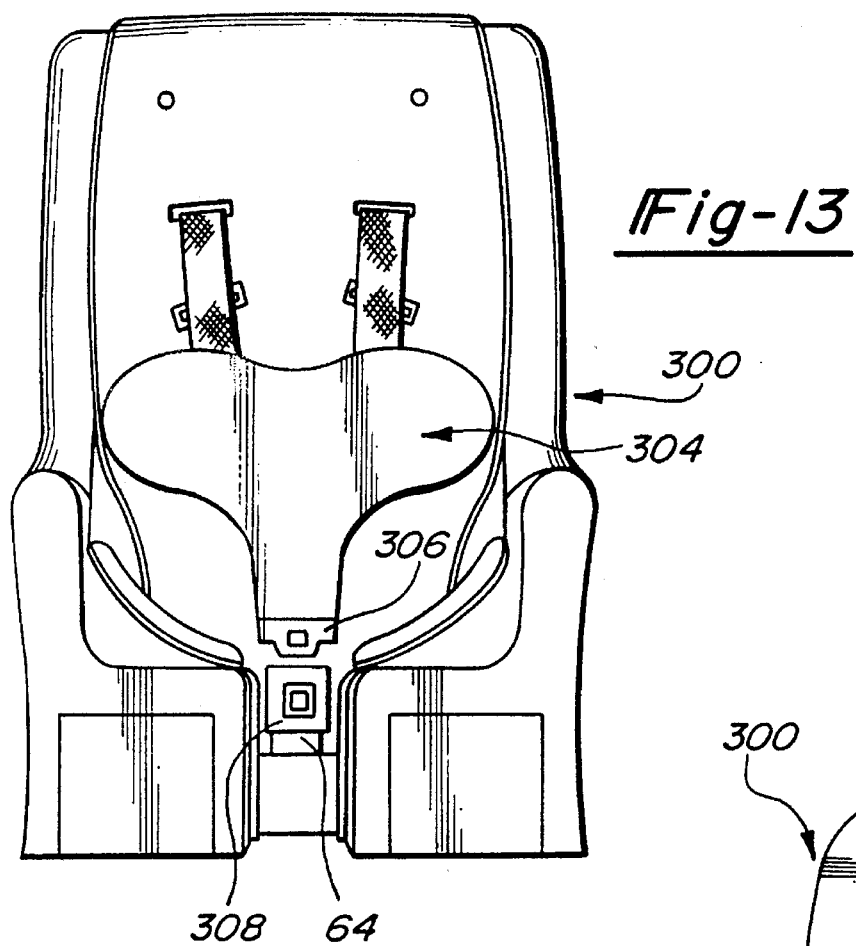
FIG. 13 is a front view of an exemplary auxiliary child seat having the automatic linear-type belt retractor of the present invention incorporated therein.
Figure 14:
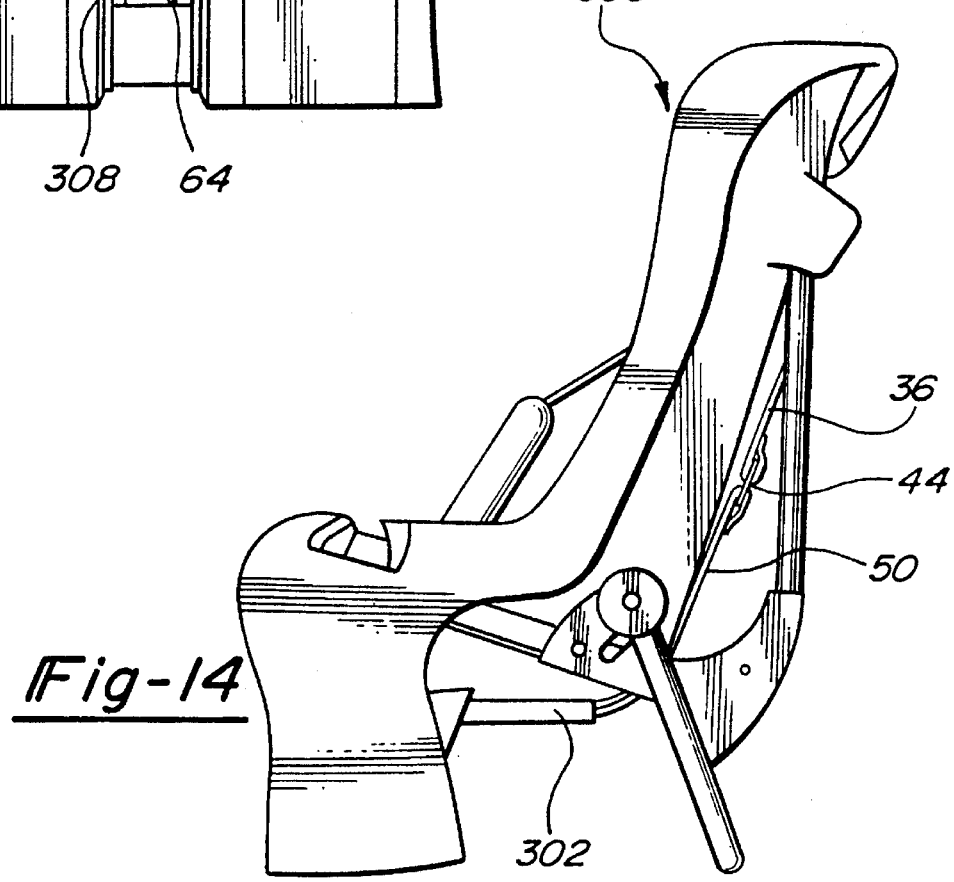
FIG. 14 is a side view of FIG. 13.

For the express purposes of showing alternative vehicular applications for the various embodiments of linear-type belt retractors disclosed herein, FIGS. 13 and 14 illustrate an otherwise conventional auxiliary child seat 300 having a linear-type belt retractor 302 incorporated therein. Auxiliary child seat 300 is also shown to include an exemplary harness restraint 304. Linear-type belt retractor 302 is shown mounted to an underside seat portion of child seat 300 and is operable for adjusting the effective length of tension belt 50 for causing corresponding extension and retraction of harness restraint 304. According to a preferred construction, linear-type belt retractor 302 is substantially identical to linear-type belt retractor 56 for automatically inhibiting withdrawal of harness restraint 304 upon buckling of tongue plate 306 into belt buckle 308. In addition, it is contemplated that linear-type belt retractor 302 have locking mechanism 58 incorporated thereon for exerting the continuous retractive force on harness restraint 204, to provide the automatic belt tightening feature.

While specific embodiments have been shown and described in detail to illustrate the principles of the present invention, it will be understood that the present invention may be embodied otherwise without departing from such principles. For example, one skilled in the art will readily recognize from such discussion and from the accompanying drawings and claims that various changes, modifications and variations can be made therein without departing from the spirit and scope of the invention as defined in the following claims.

What is claimed is:

1. A safety belt retractor comprising:

a first member;

a second member supported for longitudinal movement on said first member;

a belt member of a safety belt harness that is secured to said second member such that longitudinal movement of said second member in a first direction corresponds to withdrawal of said safety belt harness and longitudinal movement in a second direction causes retraction of said safety belt harness, said harness adapted to extend over a seat occupant and includes a tongue plate that is releasably engageable with a belt buckle, said belt buckle having an operator that is movable from a first position to a second position in response to insertion of said tongue plate into said belt buckle;

latch means retained on said second member for movement between a released position displaced from said first member for permitting movement of said second member in both of said first and second directions, and a locked position engaging said first member for inhibiting movement of said second member in said first direction;

first biasing means for normally biasing said latch means toward said locked position;

a release member that is movable between a non-actuated position and an actuated position, said release member engaging said latch means in said non-actuated position for retaining said latch means in said release position, and said release member being disengaged from said latch means when in said actuated position for permitting said first biasing means to urge said latch means into said locked position;

a coupling interconnecting said operator to said release member for causing movement of said release member from said non-actuated position to said actuated position in response to movement of said operator from said first position to said second position; and second biasing means for urging said release member to move to said non-actuated position in response to said tongue plate being released from locked engagement with said belt buckle.

2. The safety belt retractor of claim 1 wherein said coupling is a cable assembly having a cable operably interconnecting said operator to said release member such that movement of one of said operator and release member causes concurrent movement of the other thereof.

3. The safety belt retractor of claim 1 wherein said coupling comprises a toothed pawl in meshed engagement with a toothed rack formed on said release member, and a cable assembly having a cable member coupled at its first end to said operator and at its second end to said toothed pawl, whereby movement of said operator toward said second position in response to engagement of said tongue plate therewith upon insertion into said belt buckle causes said cable member to move said pawl for concurrently moving said release plate toward said actuated position.

4. The safety belt retractor of claim 3 wherein upon release of said tongue plate from said belt buckle said second biasing means forcibly urges said release member to move toward said non-actuated position such that said cable member causes said pawl member to concurrently move therewith for moving said operator toward said first position.

5. The safety belt retractor of claim 4 wherein said cable assembly further includes an outer conduit coaxially surrounding said cable member, and a body member supported for pivotable movement relative to said first member about a first pivot axis, said conduit having an end portion journally retained within a bore formed in said body member for permitting rotation of said conduit about a second axis that is generally coincident with said cable member, and said body member having a channel within which a portion of said cable member adjacent said pawl member is retained with said second end thereof extending from said channel so as to be generally aligned with said first pivot axis, whereby said cable member is inhibited from bending during pivotable movement of said body member and cable assembly about said first pivot axis.

6. The safety belt retractor of claim 5 wherein said first end of said cable has a ferrule coupled thereto that is retained within a socket formed in said operator, and said second end of said cable has a second ferrule coupled thereto that is retained in a socket formed in said toothed pawl.

7. The safety belt retractor of claim 3 wherein said first member is a lock plate having a series of longitudinally aligned locking apertures formed therein, said second member is a latch assembly retained for reciprocal longitudinal movement on said lock plate, and wherein said latch means includes a latch member supported from said hatch assembly and having a projection formed thereon, said latch member being movable with respect to said lock plate between said locked position wherein said projection is lockingly retained within one of said locking apertures and said release position wherein said projection is displaced from said locking apertures, said first biasing means being adapted to normally bias said projection on said latch member toward said locking apertures.

8. The safety belt retractor of claim 7 further comprising third biasing means for normally biasing said latch assembly for movement in said second direction, and wherein movement of said latch member to said released position in response to movement of said release member to said non-actuated position acts to release said projection on said latch assembly from engagement with one of said locking apertures for permitting longitudinal movement of said latch assembly in either of said first and second directions.

9. The safety belt retractor of claim 7 wherein said belt member has a first end coupled to said safety belt harness and a second end fixed to a stationary surface, an intermediate portion of said belt member being slidably retained on said latch assembly such that reciprocal longitudinal movement of said latch assembly corresponds to a corresponding increase or decrease in the effective length of said belt member, whereby a predetermined amount of travel of said latch assembly results in a change in the effective length of said belt member having a magnitude equal to twice said predetermined amount of travel.

10. The safety belt retractor of claim 7 wherein said lock plate is fixed to a seat portion of a child restraint seat and said belt member is coupled to a harness restraint provided for retaining a child within said child restraint seat.

11. A child restraint seat comprising:

a seat member and a seatback configured to receive a child in a seated position therein;

a belt-type harness adapted to extend over a child seated on said seat member and having a first fastener that is releasably engageable with a second fastener coupled to said seat member;

a retractor mounted to one of said seat member and said seatback and including a first member, a second member supported for longitudinal movement on said first member and having a belt member of said belt harness secured thereto such that longitudinal movement of said second member in a first direction corresponds to withdrawal of said belt harness and longitudinal movement in a second direction causes retraction of said belt harness, latch means retained on said second member for movement between a released position displaced from said first member for permitting movement of said second member in both of said first and second directions, and a locked position engaging said first member for inhibiting movement of said second member in said first direction, first biasing means for normally biasing said latch means toward said locked position, a release member that is movable between a non-actuated position and an actuated position, said release member engaging said latch means in said non-actuated position for retaining said latch means in said released position, and said release member being disengaged from said latch means when in said actuated position for permitting said first biasing means to urge said latch means into said locked position, second biasing means for normally biasing said release member toward said non-actuated position; and an actuation device for automatically moving said release member to said actuated position in response to locked engagement of said first and second fasteners, said actuation device including an operator mounted on said second fastener for movement from a first position to a second position in response to locked engagement of said first and second fasteners, and a coupling interconnecting said operator to said release member such that movement of said operator from said first position to said second position causes concurrent movement of said release member from said non-actuated position to said actuated position.

12. The child restraint seat of claim 11 wherein said coupling includes a cable assembly having a cable operably interconnecting said operator to said release member such that movement of one of said operator and release member causes concurrent movement of the other thereof.

13. The child restraint seat of claim 11 wherein said actuation device further comprises a toothed pawl in meshed engagement with a toothed rack formed on said release member, and wherein said coupling includes a cable assembly having a cable member coupled at its first end to said operator and at its second end to said toothed pawl, whereby movement of said operator toward said second position in response to engagement of said first fastener therewith upon insertion into said second fastener causes said cable member to move said pawl for concurrently moving said release plate toward said actuated position.

14. The child restraint seat of claim 13 wherein upon release of said first fastener from said second fastener said second biasing means forcibly urges said release member to move toward said non-actuated position such that said cable member causes said pawl member to concurrently move therewith for moving said operator toward said first position.

15. The child restraint seat of claim 14 wherein said cable assembly further includes an outer conduit coaxially surrounding said cable member, and a body member supported for pivotable movement relative to said first member about a first pivot axis, said conduit having an end portion journally retained within a bore formed in said body member for permitting rotation of said conduit about a second axis that is generally coincident with said cable member, and said body member having a channel which with a portion of said cable member adjacent said pawl member is retained with said second end thereof extending from said channel so as to be generally aligned with said first pivot axis, whereby said cable member is inhibited from bending during pivotable movement of said body member and cable assembly about said first pivot axis.

16. The child restraint seat of claim 15 wherein said first end of said cable has a ferrule coupled thereto that is retained within a socket formed in said operator, and said second end of said cable has a second ferrule coupled thereto that is retained in a socket formed in said toothed pawl.

17. The child restraint seat of claim 13 wherein said first member is a lock plate having a series of longitudinally aligned locking apertures formed therein, said second member is a latch assembly retained for reciprocal longitudinal movement on said lock plate, and wherein said latch means includes a latch member supported from said latch assembly and having a projection formed thereon, said latch member being movable with respect to said lock plate between said locked position wherein said projection is lockingly retained within one of said locking apertures and said release position wherein said projection is displaced from said locking apertures, said first biasing means being adapted to normally bias said projection on said latch member toward said locking apertures.

18. The child restraint seat of claim 17 further comprising third biasing means for normally biasing said latch assembly for movement in said second direction, and wherein movement of said latch member to said released position in response to movement of said release member to said non-actuated position acts to release said projection on said latch assembly from engagement with one of said locking apertures for permitting longitudinal movement of said latch assembly in either of said first and second directions.

19. The child restraint seat of claim 17 wherein said belt member has a first end coupled to said belt harness and a second end fixed to said seat member, an intermediate portion of said belt member being slidably retained on said latch assembly such that reciprocal longitudinal movement of said latch assembly corresponds to a corresponding increase or decrease in the effective length of said belt member, whereby a predetermined amount of travel of said latch assembly results in a change in the effective length of said belt member having a magnitude equal to twice said predetermined amount of travel.

20. The child restraint seat of claim 17 wherein said lock plate is fixed to said seat member and said belt member is coupled to said belt harness provided for retaining a child within said child restraint seat.

21. The child restraint seat of claim 17 wherein said child restraint seat is an integral child seat that is convertible from a positioned stored in a backrest portion of an existing seat unit to a deployed position for exposing said seat member and said seatback.

22. A seating arrangement for accommodating an adult in a seated position and having an integral child seat convertible from a position stored within a backrest member to a deployed position for accommodating a child, comprising:

said integral child seat having a seat member, a seatback and a belt-type harness that is adapted to extend over a child seated thereon, said belt harness has a tongue plate that is releasably engageable with a belt buckle fixed to said seat member; and a retractor mounted to one of said seat member and said seatback and including a first member, a second member supported for longitudinal movement on said first member and having a belt member of said belt harness secured thereto such that longitudinal movement of said second member in a first direction corresponds to withdrawal of said belt harness and longitudinal movement in a second direction causes retraction of said safety belt harness, latch means retained on said second member for movement between a released position displaced from said first member for permitting movement of said second member in both of said first and second directions, and a locked position engaging said first member for inhibiting movement of said second member in said first direction, first biasing means for normally biasing said latch means toward said locked position, a release member that is movable between a non-actuated position and an actuated position, said release member engaging said latch means in said non-actuated position for retaining said latch means in said released position, and said release member being disengaged from said latch means when in said actuated position for permitting said biasing means to urge said latch means into said locked position, second biasing means for normally biasing said release member toward said non-actuated position, and actuator means for moving said release member from said non-actuated position to said actuated position in response to locked engagement of said tongue plate with said belt buckle, said actuator means including an operator mounted on said belt buckle for movement from a first position to a second position in response to insertion of said tongue plate into said belt buckle, and a coupling for coupling said operator to said release member such that movement of said operator from said first position to said second position causes concurrent movement of said release member from said non-actuated position to said actuated position.

23. The seating arrangement of claim 22 wherein said coupling includes a cable assembly having a cable housed with a sheathing, said cable operably interconnecting said operator to said release member such that movement of one of said operator and release member causes concurrent movement of the other thereof.

24. The seating arrangement of claim 22 wherein said actuator means further comprises a toothed pawl in meshed engagement with a toothed rack formed on said release member and wherein said coupling is a cable assembly having a cable member coupled at a first end to said operator and at its second end to said toothed pawl, whereby movement of said operator toward said second position in response to engagement of said tongue plate therewith upon insertion thereof into said buckle member causes said cable member to move said pawl for concurrently moving said release plate toward said actuated position.

25. The seating arrangement of claim 24 wherein said first end of said cable has a ferrule coupled thereto that is retained within a socket formed in said operator, and said second end of said cable has a second ferrule coupled thereto that is retained in a socket formed in said toothed pawl.

26. The seating arrangement of claim 24 wherein upon release of said tongue plate from said belt buckle member said second biasing means forcibly urges said release member to move toward said non-actuated position such that said cable member causes said pawl member to concurrently move therewith for moving said operator toward said first position.

27. The seating arrangement of claim 26 wherein said cable assembly further includes an outer conduit coaxially surrounding said cable member, and a body member supported for pivotable movement relative to said first member about a first pivot axis, said conduit having an end portion journally retained within a bore formed in said body member for permitting rotation of said conduit about a second axis that is generally coincident with said cable member, and said body member having a channel which with a portion of said cable member adjacent said pawl member is retained with said second end thereof extending from said channel so as to be generally aligned with said first pivot axis, whereby said cable member is inhibited from bending during pivotable movement of said body member and cable assembly about said first pivot axis.

28. A safety belt restraint system for a child seat comprising:

a safety belt having a tongue plate attached thereto;

a retractor coupled to said safety belt and operable in a released mode for permitting said safety belt to be controllably withdrawn and retracted and in a locked mode for inhibiting withdrawal of said safety belt, said retractor including first means movable between a first position for placing said retractor in said released mode and a second position for placing said retractor in said locked mode;

a belt buckle located remotely from said retractor and including second means movable in response to insertion of said tongue plate into said belt buckle; and remote actuation means for shifting said retractor from said released mode into said locked mode in response to insertion of said tongue plate into said belt buckle, said remote actuation means comprising a cable operably connecting said first means to said second means such that movement of one of said first and second means causes movement of the other said first and second means.

29. The safety belt restraint system of claim 28 further comprising third means for moving said first means from said second position to said first position so as to automatically shift said retractor from said locked mode to said released mode in response to release of said tongue plate from said belt buckle.

30. The safety belt restraint system of claim 28 wherein said retractor further comprises a first member and a second member supported for movement on said first member, said safety belt being secured to said second member such that movement of said second member in a first direction corresponds to withdrawal of said safety belt and movement in a second direction causes retraction of said safety belt, and wherein said first means is operable in said first position to permit movement of said second member in both of said first and second directions and in said second position to inhibit movement of said second member in said first direction, said first means comprising a latch member retained on said second member for selective engagement with said first member and a release member that is movable between said first position and said second position, said release member acting on said latch member when in said first position for releasing said latch member from latched engagement with said first member, and in said second position said release member permits said latch member to lockingly engage said first member.

31. The safety belt restraint system of claim 30 wherein said remote actuation means is operable for causing said release member to move from said first position to said second position in response to locked engagement of said tongue plate with said buckle member, and further comprising a biasing mechanism acting on one of said release member and said second means for urging said release member to move to said first position in response to said tongue plate being released from locked engagement with said buckle member.

32. The safety belt restraint system of claim 30 wherein said second means includes an operator adapted to move in response to contact with said tongue plate from a non-actuated position to an actuated position for causing said release member to concurrently move from said first position to said second position.

33. The safety belt restraint system of claim 32 wherein said remote actuation means further comprises a toothed pawl in meshed engagement with a toothed rack formed on said release member, and said cable member being coupled at one end to said operator and at its other end to said toothed pawl, whereby movement of said operator toward said actuated position in response to engagement of said tongue plate therewith upon insertion into said buckle member causes said cable member to move said pawl for concurrently moving said release plate toward said second position, and wherein upon release of said tongue plate from said belt buckle member a biasing mechanism forcibly urges said release member to move toward said first position such that said cable member causes said pawl member to concurrently move therewith for moving said operator toward said non-actuated position.

34. The safety belt restraint system of claim 30 wherein said first member is a lock plate having a series of longitudinally aligned locking apertures formed therein, said second member is a latch assembly retained for reciprocal longitudinal movement on said lock plate, and wherein said latch member is supported from said latch assembly and has a projection formed thereon, said latch member being movable with respect to said lock plate between a locked position wherein said projection is lockingly retained within one of said locking apertures and a released position wherein said projection is displaced from said locking apertures, and said latch assembly includes biasing means adapted to normally bias said projection on said latch member toward said locking apertures.

35. The safety belt restraint system of claim 34 wherein said lock plate is fixed to a seat portion of a child restraint seat and said safety belt is coupled to a harness restraint provided for retaining a child within said child restraint seat.

36. A child restraint seat comprising:

a seat member and a seatback configured to receive a child in a seated position therein;

a belt-type harness adapted to extend over a child seated on said seat member and having a tongue plate attached thereto;

a retractor mounted to one of said seat member and said seatback and having a belt member of said harness secured thereto, said retractor being operable in a released mode for permitting said belt member to be controllably withdrawn and retracted and in a locked mode for inhibiting withdrawal of said belt member, said retractor including first means movable between a first position for placing said retractor in said released mode and a second position for placing said retractor in said locked mode;

a belt buckle coupled to said seat member and located remotely from said retractor, said belt buckle including second means movable in response to insertion of said tongue plate into said belt buckle; and remote actuation means for shifting said retractor from said released mode into said locked mode in response to insertion of said tongue plate into said belt buckle, said remote actuation means including a cable operably connecting said first means to said second means such that movement of one of said first and second means causes concurrent movement of the other said first and second means.

37. A seating arrangement for accommodating an adult in a seated position and having an integral child seat convertible from a position stored within a backrest member to a deployed position for accommodating a child, comprising:

said integral child seat having a seat member, a seatback and a belt-type harness that is adapted to extend over a child seated on said integral child seat, said belt harness having a tongue plate attached thereto;

a retractor coupled to one of said seat member and said seatback and having a belt member of said belt harness secured thereto, said retractor being operable in a released mode for permitting said belt member to be controllably withdrawn and retracted and in a locked mode for inhibiting withdrawal of said belt member, said retractor including first means movable between a first position for placing said retractor in said released mode and a second position for placing said retractor in said locked mode;

a belt buckle coupled to said seat member so as to be located remotely from said retractor and including second means movable in response to insertion of said tongue plate into said belt buckle; and remote actuation means for shifting said retractor from said released mode into said locked mode in response to insertion of said tongue plate into said belt buckle, said remote actuation means comprising a cable operably connecting said first means to said second means such that movement of one of said first and second means causes concurrent movement of the other said first and second means.

* * * * *

UNITED STATES PATENT AND TRADEMARK OFFICE
CERTIFICATE OF CORRECTION

PATENT NO. : 5,529,381
DATED : June 25, 1996
INVENTOR(S) : Weiping Zhao et al.

It is certified that error appears in the above-indentified patent and that said Letters Patent is hereby corrected as shown below:

ON THE TITLE PAGE, under "Inventors:",
"Weiping Zhao, Westland, John J. Pollard, Ferndale, both of Mich."
should be
--Weiping Zhao, Westland, John J. Pollard, Imlay City, Cecil A. Collins, Shelby Township, Cecil L. Champion, Madison Heights, all of Mich.--.

Column 17, line 55, claim 27, after "channel", insert --within--.

Column 17, line 55, claim 27, after "which", delete "with".

Signed and Sealed this

Second Day of September, 1997

*Attest:*

BRUCE LEHMAN

*Attesting Officer*  Commissioner of Patents and Trademarks